# 3,192,181
HEAT ACTIVATED CURING SYSTEM FOR ORGANOSILICON COMPOUNDS

Ronald F. Moore, Midland, Mich., assignor to Dow Corning Corporation, Midland, Mich., a corporation of Michigan
No Drawing. Filed June 18, 1962, Ser. No. 202,974
25 Claims. (Cl. 260—46.5)

This invention relates to a new heat activated curing system for organosilicon compounds.

Many articles of commerce based on organosilicon compounds are of the type that can be easily formed to a desired shape or applied to a desired area, after which the easily worked material is then cured to retain its desired configuration. For example, polysiloxane elastomers are normally supplied as formable materials ranging from thin pastes to stiff plastic dough-like materials. These materials are shaped by such as molding and extruding, after which the article is converted to the rubbery state by curing, a process often called vulcanization when applied to an elastomer. The article then retains its desired shape, or if deformed, will seek to return to its vulcanized, or cured configuration. Similarly, polysiloxane resins, obtainable as fluids, fusible solids and solutions are also formed or applied and thereafter cured.

The curing methods employed for organosilicon compounds can be placed into two classes. The first are those that occur spontaneously at room temperature, exemplified by the curing systems such as described in U.S. Patents 2,833,742, 2,843,555, 2,902,467, 2,934,519 and 2,999,077. The second are those that require heat to activate the curing reaction, such as organic peroxides, and the various sulfur-type cures more commonly used in connection with organic rubber. The instant composition is of the latter type, that is, it is heat activated. The system is similar to the curing system described in U.S. Patent 3,020,260, but differs therefrom in that the instant system is inactive at room temperature.

It is an object of the present invention to provide a novel useful heat activated curing system for organosilicon compounds.

Another object is to provide a curing system that can be incorporated into an organosilicon compound that is inert at normal temperatures.

A further object is to provide a curing system that is not inhibited by air or components of air.

A further object is to provide a heat activated cure for organosilicon compounds that imparts good stability to be cured system.

These and other objects will be apparent from the following description.

This invention discloses a new organosilicon composition comprising (1) an organosilicon compound having an average of from one to three groups per silicon atom selected from the group consisting of monovalent hydrocarbon radicals, aliphatic-unsaturation-free monovalent halohydrocarbon radicals, and cyanoalkyl radicals, there being an average per molecule of (1) of at least two monovalent hydrocarbon radicals containing aliphatic unsaturation, the remaining valences of the silicon atoms of the said organosilicon compound being satisfied by selection from the group consisting of divalent ogygen atoms, divalent hydrocarbon radicals, divalent hydrocarbon ether radicals and divalent haloarylene radicals, (2) an organosilicon compound containing silicon-bonded hydrogen atoms, there being in addition an average of up to two radicals per silicon atom selected from the group consisiting of monovalent hydrocarbon radicals free of aliphatic unsaturation, monovalent halohydrocarbon radicals free of aliphatic unsaturation and cyanoalkyl radicals, the remaining valences of the silicon atoms being satisfied by radicals selected from the group consisting of divalent oxygen atoms, divalent hydrocarbon radicals free of aliphatic unsaturation, divalent hydrocarbon ether radicals free of aliphatic unsaturation and divalent haloarylene radicals, there being an average of at least two silicon-bonded hydrogen atoms per molecule of (2), the sum of the average number of aliphatic unsaturated monovalent radicals per molecule of (1) and the average number of silicon-bonded hydrogen atoms per molecule of (2) is greater than 4, (3) a platinum catalyst in an amount of at least 0.1 part per million Pt based on the combined weights of (1) and (2), and (4) at least one part per part of (3) of benzotriazole.

Oranosilicon compound (1) can be a resin, a fluid or a substantially non-flowing high polymer such as conventionally used in silicone rubber manufacture. Any monovalent hydrocarbon radical, halohydrocarbon radical or cyanoalkyl radical that can be used with organosilicon compounds as stated above is operable in component (1). Examples of monovalent hydrocarbon radicals that can be used include, for example, alkyl radicals such as methyl, ethyl, isopropyl, tert-butyl, octadecyl and myricyl; cycloalkyl radicals such as cyclopentyl and cyclohexyl; aralkyl radicals such as benzyl and 2-phenylethyl; aryl radicals such as phenyl, tolyl, xylyl, naphthyl, xenyl and anthracyl; and radicals containing aliphatic unsaturation such as vinyl, allyl, methallyl, ethynyl, butadienyl, cyclopentenyl, m-vinylphenyl and the like.

Any monovalent halohydrocarbon radical and cyanoalkyl radical can be used in (1), and include, for example, chloromethyl, 3,3,3-trifluoropropyl, 2,3-dibromocyclopentyl, iodophenyl, dichloronaphthyl, 2-cyanoethyl, 2-cyanopropyl, and omega-cyanooctadecyl.

In component (1) there must be an average per molecule of at least two radicals containing aliphatic unsaturation. These radicals enter into the curing reaction discussed below. More than two said radicals can be present, but a minimum of two (average per molecule) is necessary to obtain a cure to a coherent solid. When the average number of aliphatically unsaturated radicals per molecule is more than two, a correspondingly tighter cure is obtained.

The monovalent organic radicals in (1) can be the same or different. In addition, the aliphatically unsaturated radicals can be the same or different. As well, organosilicon compound (1) can be a copolymer or mixture of copolymers.

The remaining valences of the silicon atoms in organosilicon compound (1) are satisfied by divalent oxygen, divalent hydrocarbon radicals, divalent hydrocarbon ether radicals and divalent haloarylene radicals. Any one or more of the said divalent linkages can be present in component (1).

Examples of divalent radicals that can be used in component (1) include, for example, hydrocarbon radicals such as

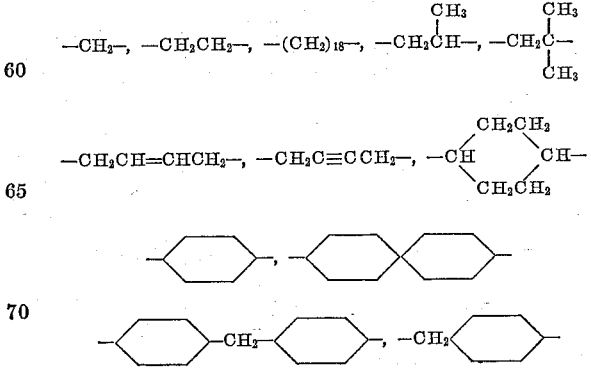

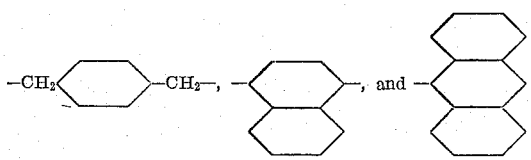

hydrocarbon ether radicals such as

—CH₂CH₂OCH₂CH₂—, —CH₂CH₂CH₂OCH₂CH₂—
and

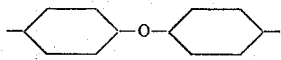

and haloarylene radicals such as

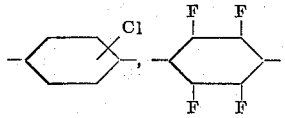

and

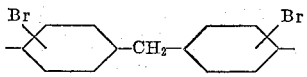

Any of the divalent linkages stated above can be present in component (1). However, where the average number of silicon atoms per molecule is greater than three, it is preferred when use of the finished product will include both extremely high and extremely low temperature exposure, that at least 50 percent of the divalent linkages be oxygen. This is not necessary, however, particularly when component (1) is a cyclic material.

Preparation of materials that can be component (1) are well known in the art. The monovalent radicals can be attached for instance, by either the so-called "direct process," or via Grignard reactions, or in some cases by a pseudo Friedel-Crafts reaction. Other reactions normally used to introduce organic radicals can of course be also used. Silicon-bonded oxygen is introduced by hydrolysis of a hydrolyzable group on silicon (such as halogen, alcoholoxy or acyloxy) as well known in the art. Divalent organic radicals can be introduced via Wurtz-type synthesis, Grignard, direct process, etc. The preparations of compounds suitable for use as component (1) are well known in the art and need not be recited herein.

Organosilicon compound (2) can be any compound as above defined. It can contain two or more silicon-bonded hydrogen radicals per molecule and in addition an average of up to two monovalent radicals per silicon atom as above set forth. These can include, for example, alkyl radicals such as methyl, ethyl, isopropyl, tert-amyl, octadecyl and myricyl; cycloalkyl radicals such as cyclopentyl and cyclohexyl; aralkyl radicals such as benzyl, β-phenylethyl and xylyl; and aryl radicals such as phenyl, tolyl, xenyl, naphthyl and anthracyl. In addition, monovalent halohydrocarbon radicals such as chloromethyl, 3,3,3-trifluoropropyl, α,α,α-trifluorotolyl, bromophenyl and 2,3-dibromocyclopentyl can be present in component (2). Also, cyanoalkyl radicals such as cyanoethyl and cyanobutyl can also be present. The organic radicals can be alike or different. Component (2) can, in addition, be a copolymer or mixture of two or more copolymers, provided only that the copolymers are free of aliphatic unsaturation and each contain an average per molecule of at least two silicon-bonded hydrogen atoms.

The remaining valences of the silicon atoms of component (2) are satisfied from divalent oxygen, divalent hydrocarbon radicals free of aliphatic unsaturation (e.g.

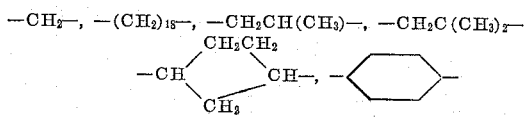

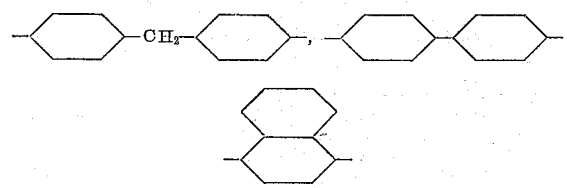

etc.), divalent hydrocarbon ether radicals free of aliphatic unsaturation (e.g.

—CH₂CH₂OCH₂CH₂—, —CH₂CH₂CH₂OCH₂CH₂—

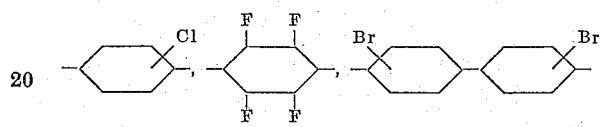

etc.), and divalent haloarylene radicals (e.g.

etc.). Any one or more of the above said divalent linkages can be present in component (2). As with component (1), when the average number of silicon atoms per molecule of (2) is greater than three it is preferred that at least 50 percent of the above divalent linkages be oxygen. This is not necessary, however, especially when component (2) is a cyclic material.

Preparation of materials that come within the definition of component (2) are well known in the art, and many examples of such materials are available commercially. Thus, recitation of methods of manufacture of these materials would be redundant herein.

The selection of components (1) and (2) is somewhat inter-related. When the average number of aliphatically unsaturated groups per molecule in component (1) is 2.0, a component (2) should be selected wherein the average number of silicon-bonded hydrogen atoms per molecule is greater than 2.0, so that the total of these just defined quantities is greater than 4. The analogous is true when the chosen component (2) contains 2.0 (average) silicon-bonded hydrogen atoms per molecule. When either component has the defined quantity greater than 2.0, selection of the other component on this basis is irrelevant. It should be understood of course, that the higher the sum of these quantities, the more highly cross-linked can be the cured composition.

The molar ratio of aliphatic unsaturated radicals in (1) to the silicon-bonded hydrogen atoms in (2) can in some cases be an important consideration. Where it is important, the ratio of these two should be preferably between 0.67 and 1.5. However, there are many instances wherein a balance of these two quantities is unimportant. For example, if a component (1) has, say, an average of six aliphatic unsaturated groups per molecule, the use of equal molar amounts of silicon-bonded hydrogen atoms may well give a cure too tight for the desired end use. Thus, less than, sometimes much less than, the equal molar amount of SiH would be used to provide the desired degree of cure. However, when maximum stability is required it is desirable to match the molar quantities of silicon-bonded hydrogen atoms in (2) to the aliphatic unsaturated radicals in (1).

Platinum compound (3) can be any of the known forms, ranging from platinum as such or as deposited on carriers such as silica gel or powdered charcoal, to platinic chloride, salts of platinum and chloroplatinic acid. Any of these forms will function in the instant curing system. A preferred form of platinum is the chloroplatinic acid either as the commonly obtainable hexahydrate or the anhydrous form, on account of its easy dispersability in organosilicon systems and its non-effect on color of the mixture.

There should be at least 0.1 part per million of platinum present in the mixture, based on the combined total weight of (1) and (2). However, since impurities in the system can easily poison this small quantity of catalyst, it is preferred to employ from 1 to 20 parts per million of platinum. A greater amount of the platinum does not affect the reaction, but does affect the requirement of component (4) below, and economic considerations suggest the lower amounts mentioned.

The key component of the instant composition is benzotriazole. When present in sufficient amount, this component completely prevents the platinum from catalyzing at room temperature (and up to about 60° C.) the reaction between the SiH in (2) and aliphatically unsaturated radicals in (1). The amount of benzotriazole required depends on (a) the amount of platinum, (b) the form of platinum catalyst, and (c) the precence or absence of some non-essential components. There must be present at least one part of benzotriazole per part of platinum. When, for instance, chloroplatinic acid is used, the requirement of benzotriazole may be nearer two parts per part of platinum. When, for example, silica fillers are present, the benzotriazole requirement may increase to 5 to 50 parts per part of platinum, dependent on the type of silica. Dispersions of compounds in organic solvents such as xylene can some time effect the benzotriazole requirement. The benzotriazole requirement has varied in filler-containing organosilicon rubber compositions all the way from about 10 to nearly 200 parts per part of platinum.

Regardless, for any overall matrix involving this curing system, there is an easily determined minimum requirement of benzotriazole that will effectively neutralize at ordinary temperatures the catalytic tendency of the platinum toward causing interaction of SiH groups with aliphatically unsaturated radicals, which requirement ranges up to more than 200 parts of benzotriazole per part of platinum, depending as already stated on the matrix in which it is employed. This minimum is easily determined by the skilled worker. There is no advantage, neither is there disadvantage other than waste of benzotriazole to use more than the minimum amount, although it may be preferred to use about 50 percent excess of benzotriazole over the minimum determined amount as a safety margin. Even at these levels, the amount of benzotriazole normally added is measured in only up to hundreds of parts per mililon, or quite a bit less than 0.1 percent of the combined weights of components (1) and (2).

The use of benzotriazole to completely prevent room temperature cure of the stated organosilicon system is only one way in which it can be employed. Benzotriazole can also be added in less than sufficient amount that completely prevents curing at room temperature. In this event the rate of cure at room temperature of the system is slowed according to the amount of benzotriazole added. This is extremely useful in a system which, if comprising only components (1), (2) and (3) of this invention would cure in, say, four hours at room temperature, but which with the addition of the proper amount of benzotriazole would require, for instance, 24 hours at room temperature. This would allow an end-user a much longer time in which to use the mixture for coating, dipping, spraying, etc., before any given mixture became cured. In this use of benzotriazole its inhibiting effect can be negated by heating the composition, preferably above 70° C., to hasten the cure.

Thus, the key component of this invention, which is benzotriazole, can be used to retard the room temperature cure or prevent the room temperature cure (infinite retardation) of a system which cures by the platinum-catalyzed interaction of SiH with unsaturated aliphatic radicals on silicon.

As in the case wherein sufficient benzotriazole is used to prevent room temperature cure, the amount of benzotriazole used to retard the said cure is dependent upon the amount and nature of the platinum catalyst and other components in the system to be cured. In addition, more benzotriazole will give more retardation, while less will give less retardation. The amount of benzotriazole to be used in a given system to obtain a given retardation is easily determined by the skilled worker.

The components of this invention can be mixed in any order. While the addition of the platinum without the benzotriazole will cause the beginning of interaction of components (1) and (2), the extent of reaction in a few minutes time at ordinary temperatures is negligible, within which time the benzotriazole will normally have been added. In systems where even this small amount of interaction might be deleterious, the benzotriazole can be added before the platinum. A preferred method of mixing is to premix components (1) and (3), premix components (2) and (4), and then combine these two premixtures. Another preferred method is to add the benzotriazole to component (1) and then add the remaining components. However, a set order is not necessary to the functioning of this curing system.

The system can be mixed just prior to use (contemplated cure) or can be mixed and stored for later use. In addition, one or more of the components can be omitted, provided only that when components (1), (2) and (3) are present, component (4) must also be present. In addition, the storage of a mixture of components (2) and (3) alone is not preferred, for should moisture be present or be introduced, an undesirable alternate reaction can occur. Thus, components (1), (2) and (4) can be stored together and component (3) added later, or (1), (3) and (4) to which (2) is added later, etc. Further, components (2), (3) and (4) can be conveniently stored together and added to component (1) when desired. Such a system is especially desirable in the silicone rubber field, wherein the diorganopolysiloxane polymers each have essentially the same amount of aliphatic unsaturation, wherefore the addition of components (2), (3) and (4) as a premixture is quite feasible.

As stated earlier, with sufficient benzotriazole the curing system is stable; that is, it does not cause curing of the organosilicon composition, at ordinary temperatures. For instance, even at 49° C. (120° F.) a fluid composition corresponding to the instant invention with sufficent benzotriazole showed essentially no change in viscosity after 4 days. At 70° C., however, this same mixture was a vulcanized rubber after 24 hours, and at 150° C. it vulcanized within 10 minutes. Thus, the instant curing system is quite stable to about 50 to 60° C., well above ordinary temperatures.

The curing reaction is that of addition of an SiH of (2) to an unsaturated radical on silicon of (1). This is a well known reaction, catalyzed by many other materials in addition to platinum. The addition of SiH to allyl on silicon serves to illustrate the reaction as follows:

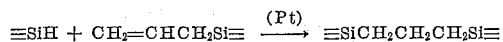

$$\equiv \text{SiH} + \text{CH}_2\!\!=\!\!\text{CHCH}_2\text{Si}\!\equiv \xrightarrow{(\text{Pt})} \equiv\text{SiCH}_2\text{CH}_2\text{CH}_2\text{Si}\!\equiv$$

It is noteworthy that no by-products are formed in the curing reaction. Thus, it is not necessary to cure the system under pressure as is the case when a curing system produces by-products which are volatile. Further, it is unnecessary to carefully postbake the cured composition, as is necessary with most other heat activated curing systems now used in silicones. It is already well known that a curing system involving SiH and aliphatic unsaturated radicals need not be employed in a closed system. It is also well recognized that neither the extent of cure nor rate of cure are inhibited by air or components thereof.

In addition to the recited components, other materials can be present in a composition utilizing this curing catalyst system. Such materials as are ordinarily used in organosilicon compositions, such as fillers (carbon black, silica aerogels, silica soots, treated silicas, alumina, clays, metal oxides, metal carbonates, metal silicates, etc.), pigments to impart certain colors to the material, rubber additives such as compression set aids, plasticizers (both organosilicon and organic), etc., can be added to the instant composition. Materials that are known to poison platinum catalysts should of course be excluded, but these are not normally included in organosilicon compounds designed to be cured by heat activated curing catalysts.

The instant composition can be used for any application requiring a resin or rubber where heat activated curing is possible. One will immediately recognize the tremendously wide variety of applications herein included. The instant curing system can be activated in closed or open systems, in thin or thick sections and under pressure and at atmospheric pressure with equal ease merely by the application of heat above about 70° C., there being complete freedom from the undesirable sponging associated with some curing systems when pressure is not used, and freedom from uncured surface, obtained particularly with organic peroxides, when the composition is cured in the open exposed to the atmosphere. Thus, advantages of this particular system include excellent thick-section cure, absence of air-inhibition, and therefore uniform cure throughout the sample. In addition, where desired, the system can serve to control (slow down) the rate of cure of a platinum catalyzed SiH-unsaturated aliphatic-on-silicon room temperature cure.

The following examples are illustrative only and should not be construed as limiting the invention which is properly delineated in the appended claims. All parts are by weight.

EXAMPLE 1

Two siloxane mixtures were prepared of the following composition.

Siloxane A:
  100 parts of a dimethylvinylsiloxy-endblocked dimethylpolysiloxane having a viscosity of 2,500 cs. at 25° C.,
  30 parts of calcined diatomaceous earth,
  25 parts of fine particle size zirconium silicate,
  1 part of butylcarbitol acetate containing 0.19 percent platinum as chloroplatinic acid.

Siloxane B:
  100 parts of the same dimethylpolysiloxane as in A,
  120 parts of calcined diatomaceous earth,
  25 parts of fine particle size zirconium silicate,
  40 parts of a mixture of iron oxide in a hydroxylated low viscosity dimethylpolysiloxane, there being 10 percent by weight of iron in the mixture,
  59.5 parts of a trimethylsiloxy-endblocked methylhydrogenpolysiloxane having an average per molecule of 10 silicon atoms.

For sample C below, 100 parts of siloxane A and 4 parts of siloxane B were mixed and the tests conducted as shown in Table I.

For sample D below, 100 parts of siloxane A, 4 parts of siloxane B and 0.06 part of a paste containing 50 percent by weight of benzotriazole and 50 percent by weight of a trimethylsiloxy-endblocked dimethylpolysiloxane having a viscosity of 100 cs. at 25° C. were mixed, and the tests conducted as shown in Table I. This composition contains 11 parts per million platinum and 290 parts per million benzotriazole.

*Table I*

| Sample | Time after mixing | Viscosity, cs. | Remarks |
| --- | --- | --- | --- |
| C | None | 30,000 | |
|   | 1½ hrs. | | Sample had gelled. |
|   | 24 hrs. | | Rubber. |
| D | None | 30,000 | |
|   | 1 hr. | 30,000 | Note 1. |
|   | 1 week | 25,000 | Note 1. |
|   | 2 weeks | 23,000 | Note 1. |

NOTE.—These samples vulcanized to rubber when heated 15 minutes at 150° C.

EXAMPLE 2

Siloxane mixture E was prepared of the following composition:

100 parts of a vinyldimethylsiloxy-endblocked dimethylpolysiloxane having a viscosity of 2,500 cs. at 25° C.
80 parts of ground quartz having an average particle size of 5 microns,
1 part of butyl Carbitol acetate containing 0.19 percent platinum as chloroplatinic acid.

For sample F below, 100 parts of siloxane E and 4 parts of siloxane B, shown in Example 1, were mixed and the tests conducted as shown in Table II.

For sample G below, 97 parts of siloxane E, 3 parts of a paste containing 50 percent by weight of a dimethylpolysiloxane having a viscosity of 100 cs. at 25° C. and 50 percent by weight of zinc oxide, 4 parts of siloxane B, and 0.016 part of benzotriazole were mixed and the tests conducted as shown in Table II.

*Table II*

| Sample | Time after mixing | Viscosity | Ratio to 0 viscosity |
| --- | --- | --- | --- |
| F | 0 | 12,000 cs. | |
|   | 1 hr. | 53,000 cs. | 4.4 |
|   | 2 hrs. | 168,000 cs. | 14.0 |
|   | 4 hrs. | Rubber | |
| G | 0 | 15,000 cs. | |
|   | 1 hr. | 40,000 cs. | 2.7 |
|   | 4 hrs. | 142,000 cs. | 9.5 |
|   | 24 hrs. | Rubber | |

EXAMPLE 3

Equivalent results are obtained when powdered platinum metal or platinum supported on gamma-alumina are substituted in equivalent amount for the butyl Carbitol acetate solution of chloroplatinic acid in Example 1.

EXAMPLE 4

Siloxane H was made, having the same composition as siloxane A of Example 1 except the chloroplatinic acid was dissolved in 2-ethylhexanol.

Sample I was prepared by mixing 100 parts of siloxane H and 4 parts of siloxane B (per Example 1). Tests were conducted as shown in Table III.

Sample J was prepared by mixing 100 parts of siloxane H, 4 parts of siloxane B and 0.06 part of benzotriazole added as a 50 percent by weight paste in the dimethylpolysiloxane of sample A (Example 1). Tests were conducted as shown in Table III.

*Table III*

| Sample | Time after mixing | Viscosity, cs. | Useful life of fluid |
| --- | --- | --- | --- |
| I | 0 | 22,000 | |
|   | 1 hr. | (Gelled) | 20 minutes. |
|   | 24 hrs. | (Rubber) | |
| J | 0 | 22,000 | |
|   | 1 hr. | 18,500 | |
|   | 4 days | 14,500 | >2 weeks. |
|   | 2 weeks | 12,500 | |

Useful life of fluid is the time fluid can be used for application before it becomes too thick and/or gelled.

EXAMPLE 4

When any of the following polysiloxanes are substituted for the dimethylpolysiloxane in siloxane A and the mixtures made per sample D as in Example 1, mixtures which are more stable (that is, do not vulcanize as readily) at room temperature are formed.

(a) A methylphenylallylsiloxy-endblocked methyl-3,3,3-fluoropropylpolysiloxane having a viscosity of 50,000 cs. at 25° C.

(b) A dimethylcyclopentenylsiloxy-endblocked copolymer containing about 50 mol percent ethylmethylsiloxane units, 5 mol percent octadecylmethylsiloxane units, 20 mol percent 2-phenylethylmethylsiloxane units and 25 mol percent units of the formula

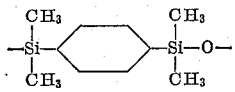

and having a viscosity of 250,000 cs. at 25° C.
(c) A mixture of (1) 10 parts of a 2-butynyldimethylsiloxy endblocked β-cyanoethylmethylsiloxane fluid having a viscosity of 700 cs. at 25° C. and (2) 90 parts of a hydroxy endblocked copolymer containing 98 mol percent chlorophenylmethylsiloxane units and 2 mol percent vinylethylsiloxane units, having a viscosity of 550 cs. at 25° C.
(d) A vinyldimethylsiloxy-endblocked copolymer containing 50 mol percent dimethylsiloxane units, 10 mol percent diphenylsiloxane units, 5 mol percent benzylmethylsiloxane units and 35 mol percent units of the formula

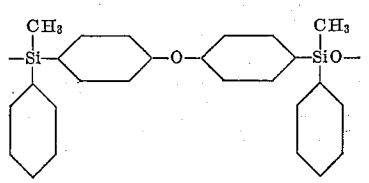

and having a viscosity of 25,000,000 cs. at 25° C.
(e) A copolymer containing 89.86 mol percent dimethylsiloxane units, 0.14 mol percent methylvinylsiloxane units and 10 mol percent units of the structure —(CH$_3$)$_2$SiCH$_2$Si(CH$_3$)$_2$O—, having a Williams plasticity of 0.100 inch.

EXAMPLE 5

When equivalent quantities of the following organosilicon compounds are substituted for the methylhydrogenpolysiloxane of siloxane B and the resulting mixture used as in sample D of Example 1, similar results are obtained:

(a)
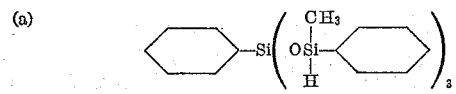

(b)
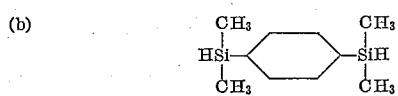

(c)
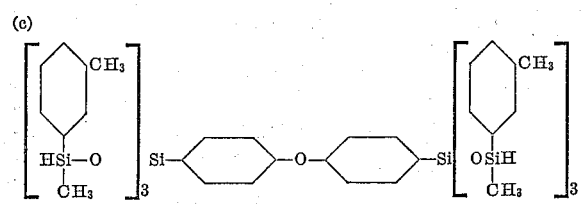

(d)
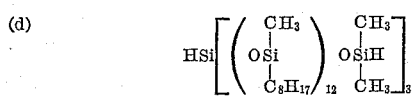

(e) A copolymer containing 40 mol percent of C$_6$H$_5$SiO$_{3/2}$ units, 40 mol percent cyclohexylmethylsiloxane units, 18 mol percent of 2-phenylpropylmethylsiloxane units, and 2 mol percent of methylhydrogensiloxane units having a viscosity of 500 cs. at 25° C.

(f) a mixture containing 10 parts of

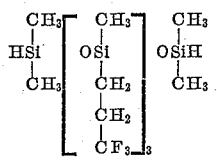

85 parts of

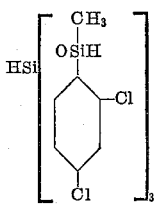

and 5 parts of

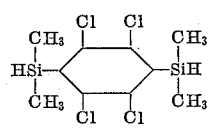

EXAMPLE 6

When sufficient benzotriazole is added to the following mixture, the resulting composition is stable at ordinary temperatures, but can be cured to a coherent solid by heating at a temperature above 70° C. until the desired cure is obtained:

100 parts of a phenylmethylhydrogensiloxy-endblocked dimethylpolysiloxane having a viscosity of 100,000 cs. at 25° C., 2.0 parts of fluid copolymer of the average composition

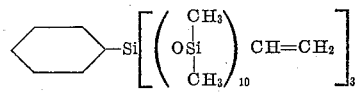

0.0002 part of platinum added as a solution of platinum sulfate in ethanol.

That which is claimed is:
1. A composition of matter comprising
  (1) an organosilicon polymer having an average of from one to three groups per silicon atom selected from the group consisting of monovalent hydrocarbon radicals, aliphatic-unsaturation-free monovalent halohydrocarbon radicals, and cyanoalkyl radicals, there being an average per molecule of (1) of at least two monovalent hydrocarbon radicals containing aliphatic unsaturation, the remaining valences of the silicon atoms of the said organosilicon polymer being satisfied by selection from the group consisting of divalent oxygen atoms, divalent hydrocarbon radicals, divalent hydrocarbon ether radicals and divalent haloarylene radicals, said divalent radicals linking silicon atoms,
  (2) an organosilicon compound containing silicon-bonded hydrogen atoms, there being in addition an average of up to two groups per silicon atom selected from the group consisting of monovalent hydrocarbon radicals free of aliphatic unsaturation, monovalent halohydrocarbon radicals free of aliphatic unsaturation and cyanoalkyl radicals, the remaining valences of the silicon atoms being satisfied by groups selected from the group consisting of divalent oxygen atoms, divalent hydrocarbon radicals free of aliphatic unsaturation, divalent hydrocarbon ether radicals free of aliphatic unsaturation and divalent haloarylene radicals, said divalent radicals linking silicon atoms, there being an average of at least two silicon-bonded hydrogen atoms per molecule of (2), the sum of the average number of aliphatic unsaturated monovalent radicals per molecule of (1) and the average number of silicon-bonded hydrogen atoms per molecule of (2) being greater than 4,
  (3) a platinum catalyst in an amount of at least 0.1 part per million Pt based on the combined weights of (1) and (2), and
  (4) at least one part by weight per part of (3) of benzotriazole.
2. A composition of matter comprising (1) a triorganosilyl endblocked diorganopolysiloxane having a viscosity of at least 100 cs. at 25° C. wherein the organic radicals are selected from the group consisting of monovalent hydrocarbon radicals, aliphatic-unsaturation-free monovalent halohydrocarbon radicals, and cyanoalkyl radicals, there being an average per molecule of (1) of at least two monovalent hydrocarbon radicals containing aliphatic unsaturation and in which up to 50 percent of the silicon atoms in the said siloxane can be connected by organic radicals selected from the group consisting of divalent hydrocarbon radicals, divalent hydrocarbon ether radicals, and divalent haloarylene radicals, (2) an organosilicon compound containing silicon-bonded hydrogen atoms, there being in addition an average of up to two groups per silicon atom selected from the group consisting of monovalent hydrocarbon radicals free of aliphatic unsaturation, monovalent halohydrocarbon radicals free of aliphatic unsaturation and cyanoalkyl radicals, the remaining valences of the silicon atoms being satisfied by groups selected from the group consisting of divalent oxygen atoms, divalent hydrocarbon radicals free of aliphatic unsaturation, divalent hydrocarbon ether radicals free of aliphatic unsaturation and divalent haloarylene radicals, said divalent radicals linking silicon atoms, there being an average at least two silicon-bonded hydrogen atoms per molecule of (2), the sum of the average number of aliphatic unsaturated monovalent radicals per molecule of (1) and the average number of silicon-bonded hydrogen atoms per molecule of (2) being greater than 4, (3) a platinum catalyst in an amount of at least 0.1 part per million Pt based on the combined weights of (1) and (2), and (4) at least one part by weight per part of (3) of benzotriazole.

3. A composition of matter according to claim 2 wherein the organic radicals of (1) are methyl and vinyl.

4. A composition of matter according to claim 2 wherein the organic radicals of (1) are methyl, phenyl and vinyl.

5. A composition of matter according to claim 2 wherein the organic radicals of (1) are methyl, 3,3,3-trifluoropropyl and vinyl.

6. A heat curable composition of matter comprising
(1) an organosilicon polymer having an average of from one to three groups per silicon atom selected from the group consisting of monovalent hydrocarbon radicals, aliphatic-unsaturation-free monovalent halohydrocarbon radicals, and cyanoalkyl radicals, there being an average per molecule of (1) of at least two monovalent hydrocarbon radicals containing aliphatic unsaturation and the remaining valences of the silicon atoms of the said organosilicon polymer being satisfied by selection from the group consisting of divalent oxygen atoms, divalent hydrocarbon radicals, divalent hydrocarbon ether radicals and divalent haloarylene radicals, said divalent radicals linking silicon atoms, (2) an organosilicon compound containing silicon-bonded hydrogen atoms, there being in addition an average of up to two groups per silicon atom selected from the group consisting of monovalent hydrocarbon radicals free of aliphatic unsaturation, monovalent halohydrocarbon radicals free of aliphatic unsaturation and cyanoalkyl radicals, the remaining valences of the silicon atoms being satisfied by groups selected from the group consisting of divalent oxygen atoms, divalent hydrocarbon radicals free of aliphatic unsaturation, divalent hydrocarbon ether radicals free of aliphatic unsaturation and divalent haloarylene radicals, said divalent radicals linking silicon atoms, there being an average at least two silicon-bonded hydrogen atoms per molecule of (2), the sum of the average number of aliphatic unsaturated monovalent radicals per molecule of (1) and the average of silicon-bonded hydrogen atoms per molecule of (2) being greater than 4, (3) a platinum catalyst in an amount of at least 0.1 part per million Pt based on the combined weights of (1) and (2), and (4) sufficient benzotriazole to maintain inactivity toward curing at temperatures below 60° C.

7. A heat curable composition of matter comprising
(1) a triorganosilyl endblocked diorganopolysiloxane having a viscosity of at least 100 cs. at 25° C. wherein the organic radicals are selected from the group consisting of monovalent hydrocarbon radicals, aliphatic-unsaturation-free monovalent halohydrocarbon radicals and cyanoalkyl radicals, there being an average per molecule of (1) at least two monovalent hydrocarbon radicals containing aliphatic unsaturation, and in which up to 50 percent of the silicon atoms in the said siloxane can be connected by organic radicals selected from the group consisting of divalent hydrocarbon radicals, divalent hydrocarbon ether radicals, and divalent haloarylene radicals, (2) an organosilicon compound containing silicon-bonded hydrogen atoms, there being in addition an average of up to two groups per silicon atom selected from the group consisting of monovalent hydrocarbon radicals free of aliphatic unsaturation, monovalent halohydrocarbon radicals free of aliphatic unsaturation and cyanoalkyl radicals, the remaining valences of the silicon atoms being satisfied by groups seleceted from the group consisting of divalent oxygen atoms, divalent hydrocarbon radicals free of aliphatic unsaturation, divalent hydrocarbon ether radicals free of aliphatic unsaturation and divalent haloarylene radicals, said divalent radicals linking silicon atoms, there being an average at least two silicon-bonded hydrogen atoms per molecule of (2), the sum of the average molecule of (1) and the average number of silicon-bonded number of aliphatic unsaturated monovalent radicals per hydrogen atoms per molecule of (2) being greater than 4, (3) a platinum catalyst in an amount of at least 0.1 part per million Pt based on the combined weights of (1) and (2), and (4) sufficient benzotriazole to maintain inactivity toward curing at temperature below 60° C.

8. The composition of claim 7 wherein the organic radicals of (1) are methyl and vinyl.

9. The composition of claim 7 wherein the organic radicals of (1) are methyl, phenyl and vinyl.

10. The composition of claim 7 wherein the organic radicals of (1) are methyl, vinyl and 3,3,3-trifluoropropyl.

11. The method which comprises
(A) mixing
(1) an organosilicon polymer having an average of from one to three groups per silicon atom selected from the group consisting of monovalent hydrocarbon radicals, aliphatic-unsaturation-free monovalent halohydrocarbon radicals, and cyanoalkyl radicals, there being an average per molecule of (1) at least two monovalent hydrocarbon radicals containing aliphatic unsaturation, the remaining valences of the silicon atoms of the said organosilicon polymer being satisfied by selection from the group consisting of divalent oxygen atoms, divalent hydrocarbon radicals, divalent hydrocarbon ether radicals and divalent haloarylene radicals, said divalent radicals linking silicon atoms, (2) an organosilicon compound containing silicon-bonded hydrogen atoms, there being in addition an average of up to two groups per silicon atom selected from the group consisting of monovalent hydrocarbon radicals free of aliphatic unsaturation, monovalent halohydrocarbon radicals free of aliphatic unsaturation and cyanoalkyl radicals, the remaining valences of the silicon atoms being satisfied by groups selected from the group consisting of divalent oxygen atoms, divalent hydrocarbon radicals free of aliphatic unsaturation, divalent hydrocarbon ether radicals free of aliphatic unsaturation and divalent haloarylene radicals, said divalent radicals linking silicon atoms, there being an average at least two silicon-bonded hydrogen atoms per molecule of (2), the sum of the average number of aliphatic unsaturated monovalent radicals per molcule of (1) and the average number of silicon-bonded hydrogen atoms per molecule of (2) being greater than 4, (3) a platinum catalyst in an amount of at least 0.1 part per million Pt based on the combined weights of (1) and (2), and (4) sufficient benzotriazole to reduce the activity toward curing, (B) and heating the mixture to cure the product to a coherent solid.

12. The method according to claim 11 in which there is sufficient benzotriazole to prevent curing at temperature below 60° C., and the mixture is heated at a temperature above 60° C. to effect cure of the product to a coherent solid.

13. The method which comprises (A) mixing (1) a triorganosilyl endblocked diorganopolysiloxane having a viscosity of at least 100 cs. at 25° C. wherein the organic radicals are selected from the group consisting of monovalent hydrocarbon radicals, ailphatic - unsaturation - free monovalent halohydrocarbon radicals and cyanoalkyl radicals, there being an average per molecule of (1) at least two monovalent hydrocarbon radicals containing aliphatic unsaturation, and in which up to 50 percent of the silicon atoms in the said siloxane can be connected by organic radicals selected from the group consisting of divalent hydrocarbon radicals, divalent hydrocarbon ether radicals, and divalent haloarylene radicals, (2) an organosilicon compound containing silicon-bonded hydrogen atoms, there being in addition an average of up to two groups per silicon atom selected from the group consisting of monovalent hydrocarbon radicals free of aliphatic unsaturation, monovalent halohydrocarbon radicals free of aliphatic unsaturation and cyanoalkyl radicals, the remaining valences of the silicon atoms being satisfied by groups selected from the group consisting of divalent oxygen atoms, divalent hydrocarbon radicals free of aliphatic unsaturation, divalent hydrocarbon ether radicals free of aliphatic unsaturation and divalent haloarylene radicals, said divalent radicals linking silicon atoms, there being an average at least two silicon-bonded hydrogen atoms per molecule of (2), the sum of the average number of aliphatic unsaturated monovalent radicals per molecule of (1) and the average number of silicon-bonded hydrogen atoms per molecule of (2) being greater than 4, (3) a platinum catalyst in an amount of at least 0.1 part per million Pt based on the combined weights of (1) and (2), and (4) sufficient benzotriazole to maintain inactivity toward curing at temperatures below 60° C., and (B) heating the resulting mixture at a temperature above 60° C. to effect cure to an elastomeric product.

14. The method of claim 13 wherein the organic radicals of (1) are methyl and vinyl.

15. A product comprising the cured composition obtained from the method of claim 14.

16. The method of claim 13 wherein the organic radicals of (1) are methyl, phenyl and vinyl.

17. A product comprising the cured composition obtained from the method of claim 16.

18. The method of claim 13 wherein the organic radicals of (1) are methyl, 3,3,3-trifluoropropyl and vinyl.

19. A product comprising the cured composition obtained from the method of claim 18.

20. A composition of matter comprising (1) an organosilicon compound containing silicon-bonded hydrogen atoms, there being in addition an average of up to two groups per silicon atom selected from the group consisting of monovalent hydrocarbon radicals free of aliphatic unsaturation, monovalent halohydrocarbon radicals free of aliphatic unsaturation and cyanoalkyl radicals, the remaining valences of the silicon atoms being satisfied by groups selected from the group consisting of divalent oxygen atoms, divalent hydrocarbon radicals free of aliphatic unsaturation, divalent hydrocarbon ether radicals free of aliphatic unsaturation and divalent haloarylene radicals, said silicon atoms linking silicon atoms, there being an average of at least two silicon-bonded hydrogen atoms per molecule of (1), (2) a platinum catalyst, and (3) at least one part by weight per part of (2) of benzotriazole.

21. The composition of claim 20, wherein (1) is a methylhydroegnsiloxane.

22. The composition of claim 20 wherein (1) is a phenylhydrogensiloxane.

23. A method of curing an organosilicon composition comprising mixing (A) an organosilicon polymer having an average of from 1 to 3 groups per silicon atom selected from the group consisting of monovalent hydrocarbon radicals, aliphatic unsaturation free monovalent halohydrocarbon radicals, and cyanoalkyl radicals, there being an average per molecule at least two monovalent hydrocarbon radicals containing aliphatic unsaturation, the remaining valences of the silicon atoms of the said organosilicon polymer being satisfied by selection from the group consisting of divalent oxygen atoms, divalent hydrocarbon radicals, divalent hydrocarbon ether radicals, divalent haloarylene radicals, said divalent radicals linking silicon atoms with a mixture, (B) comprising (1) an organosilicon compound containing silicon-bonded hydrogen atoms, there being in addition an average of up to two groups per silicon atom selected from the group consisting of monovalent hydrocarbon radicals free of aliphatic unsaturation, monovalent halohydrocarbon radicals free of aliphatic unsaturation and cyanoalkyl radicals, the remaining valences of the silicon atoms being satisfied by groups selected from the group consisting of divalent oxygen atoms, divalent hydrocarbon radicals free of aliphatic unsaturation, divalent hydrocarbon ether radicals free of aliphatic unsaturation and divalent haloarylene radicals, said divalent radicals linking silicon atoms, there being an average of at least two silicon-bonded hydrogen atoms per molecule of (1), (2) a platinum catalyst, and (3) at least one part by weight per part of (2) of benzotriazole, the amount of (2) being such that there is at least 0.1 part per million of platinum based on the combined weights (A) and (1), the amount of benzotriazole added therewith being sufficient to prevent curing of the combined materials at temperatures below 60° C. and thereafter heating the combined materials at a temperature of above 60° C. to cure the mixture of a coherent solid.

24. The method of claim 23 wherein in mixture (B) component (1) is a methylhydrogensiloxane.

25. The method of claim 23 wherein in mixture (B) component (1) is a phenylhydrogensiloxane.

References Cited by the Examiner

UNITED STATES PATENTS

| | | | |
|---|---|---|---|
| 2,637,738 | 5/53 | Wagner | 260—46.5 |
| 2,843,555 | 7/58 | Berridge | 260—46.5 |
| 3,020,260 | 2/62 | Nelson | 260—46.5 |

MURRAY TILLMAN, *Primary Examiner.*

WILLIAM H. SHORT, *Examiner.*